(12) United States Patent
Leonard et al.

(10) Patent No.: US 8,145,234 B1
(45) Date of Patent: Mar. 27, 2012

(54) SECURE USER PLANE LOCATION (SUPL) ROAMING

(75) Inventors: Leslie Paul Leonard, Monroe, WA (US); John Mark Dammrose, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 450 days.

(21) Appl. No.: 11/531,503

(22) Filed: Sep. 13, 2006

(51) Int. Cl.
*H04W 24/00* (2009.01)
*H04B 7/185* (2006.01)
*G01S 19/42* (2010.01)
*G01S 19/05* (2010.01)
*G01S 19/25* (2010.01)

(52) U.S. Cl. ............... 455/456.1; 455/456.2; 342/352; 342/357.25; 342/357.42; 342/357.64

(58) Field of Classification Search .............. 455/556.2, 455/560, 561, 456.1, 456.2; 342/352, 357.2, 342/357.25, 357.42, 357.43, 357.64; 701/213
See application file for complete search history.

(56) References Cited

U.S. PATENT DOCUMENTS

| | | | |
|---|---|---|---|
| 2002/0080063 A1* | 6/2002 | Bloebaum et al. | 342/357.1 |
| 2002/0140745 A1* | 10/2002 | Ellenby et al. | 345/848 |
| 2007/0096981 A1* | 5/2007 | Abraham | 342/357.15 |
| 2009/0028088 A1* | 1/2009 | Kangas et al. | 370/326 |

* cited by examiner

*Primary Examiner* — Wesley Kim
(74) *Attorney, Agent, or Firm* — Moazzam & Associates, LLC (57) ABSTRACT

A geographic cell identification (cell ID) database is updated on the fly as, for example, roaming user equipment (UE) reports its location during Assisted Global Positioning System (A-GPS) operations. The cell ID database relates network locations to corresponding geographic locations. The cell ID database is used to retrieve a corresponding geographic location in response to the network location at which the UE reports being located. If it is found that the cell ID database does not contain the network location reported by the UE, the geographic location of the UE can be estimated using information in the reported network location, such as Mobile Network Code, Mobile Country Code, Local Area Code and Cell ID. The geographic location can then be used to obtain A-GPS assistance data for the UE. Once assistance information has been provided to the UE and the UE has determined its geographic location, the cell ID database can be updated with the determined geographic location.

8 Claims, 5 Drawing Sheets

SECURE USER PLANE LOCATION (SUPL) ROAMING

BACKGROUND OF THE INVENTION

1. Field of the Invention

The present invention relates generally to location-based services in wireless telecommunication networks and, more specifically, to providing GPS assistance data to roaming user equipment.

2. Description of the Related Art

It is desirable to be able to determine the geographic location of a cellular telephone or other mobile user equipment (UE) in a wireless telecommunication network. The earliest use of UE location information related to emergency calling (e.g., the E911 system used in the United States), in which the network determines the location of a caller's UE and routes the call to the nearest Public Service Access Point for handling by an emergency operator. Location-based services are now expanding far beyond emergency calling, to such diverse uses as navigation, mapping, tracking and gaming.

One method by which UE location can be determined is known as Assisted GPS (A-GPS). In A-GPS, the wireless telecommunication network transmits "assistance data" to the UE to aid the UE in finding and utilizing signals transmitted by the Global Positioning System of satellites, as the GPS satellite signals that reach the receiver are sometimes weak or cannot be detected at all due to shielding and reflection from buildings or terrain. Various third parties maintain databases that provide information on the locations of GPS satellites. The databases relate geographic locations to sets of assistance data. A wireless telecommunication service provider can use the database to obtain the assistance data to transmit to a subscriber's UE when the UE location is needed.

A UE indicates that it needs assistance data by transmitting an assistance data request. The request includes information relating to the location of the UE within the service provider's network or, if the UE is roaming, the foreign network, including a Mobile Network Code (MNC) identifying the service provider on whose network the UE is operating, a Mobile Country Code (MCC) identifying the country in which the UE is operating, a Location Area Code identifying the region or area in which the UE is operating, and a Cell ID identifying the cell in which the UE is operating. By identifying the cell in which the UE is operating, the network can use the corresponding geographic location of that cell to retrieve the corresponding set of assistance data from the database. An underlying assumption is that the network that acts upon the assistance data request can determine the geographic location of the cell in which the UE is operating.

There are two major approaches that wireless telecommunication networks use to provide location-based services: control plane and user plane. The control plane approach sends GPS assistance data on the control channels that are inherent (as defined by the applicable standards) in a service provider's network infrastructure. The user plane approach sends GPS assistance data via same channels that carry user data or voice communications, typically in Internet Protocol or Short Messaging Service format. The control plane approach was originally devised for implementing emergency (E911) calling and is well suited for location-based services (LBS) in which an application or other element in the service provider network needs to determine UE location without user intervention. The user plane approach is generally believed to be better suited for LBS applications (or applets) running locally on the UE and operated by a user. With LBS applications expanding far beyond emergency calling into highly interactive areas such as navigation, mapping, tracking and gaming, network service providers are increasingly adopting the user plane approach. A standard that has emerged for implementing the user plane approach is known as Secure User Plane Location (SUPL).

The SUPL standard is directed to enabling LBS applications to be run on any A-GPS-capable phone or other UE on any wireless telecommunication network. Nevertheless, one deficiency of SUPL is that, when a subscriber's UE is roaming and requests assistance data, it is expected that the subscriber's home network SUPL server will provide it. The home network typically does not have a comprehensive database relating the identity of every cell (Cell ID) of all of its worldwide roaming partners' networks to its geographic location and thus to the set of assistance data corresponding to that location. The home network may have such a Cell ID database that includes the locations of some of its roaming partners' cells, but maintaining a current database of all of its worldwide roaming partners' cells would require extreme cooperation and frequent exchange of information among network service providers. One problem in maintaining a current database is that service providers "re-home" cells from time to time, i.e., shift the location of a cell site, or renumber Cell IDs. It has been suggested to create a network in which the SUPL servers of different service providers communicate with each other or communicate with a centralized worldwide Cell ID database, but even if such a system were available it may suffer from other problems and deficiencies.

It would be desirable to provide a method and system for providing A-GPS assistance data to roaming UE without a comprehensive Cell ID database that includes all roaming partners. It is to the provision of such a method and system that the present invention is directed.

SUMMARY OF THE INVENTION

The present invention relates to a wireless telecommunication network method and system for maintaining a geographic cell identification (cell ID) database in real time or "on the fly" as, for example, roaming user equipment (UE) reports its location during Assisted Global Positioning System (A-GPS) operations. The cell ID database relates network locations (e.g., cells or other features of network topology) to corresponding geographic locations (e.g., latitude and longitude coordinates). The cell ID database is used to retrieve a corresponding geographic location in response to the network location at which the UE reports being located. If it is found that the cell ID database does not contain the reported network location, the geographic location of the UE can be estimated in response to the network UE location.

Network location can be represented by, for example, a hierarchy of identifiers ranging from narrowest to broadest, such as one or more of the following, which are received from a UE when it requests A-GPS assistance data in embodiments of the invention that conform to the GSM standard: a Mobile Network Code (MNC) identifying the service provider on whose network the UE is operating; a Mobile Country Code (MCC) identifying the country in which the UE is operating; a Location Area Code identifying the region or area in which the UE is operating; and a Cell ID identifying the cell in which the UE is operating. Thus, for example, if the cell ID database does not contain the cell in which the UE reports operating, the geographic location of the UE can be estimated by identifying the area of the country (e.g., by Area Code) in which the UE reports operating. Similarly, if the cell ID database does not contain the area in which the UE reports operating, the geographic location of the UE can be estimated by identifying the country in which the UE reports operating. If the cell ID database does not contain the country in which the UE reports operating, the geographic location of the UE can be estimated by identifying the network service provider on whose network the UE reports operating.

In an exemplary embodiment of the invention, the home network to which the roaming UE belongs receives a request for A-GPS assistance data. As the UE is roaming at the time it issues the request, the request is forwarded to the home network by the network that the UE is visiting. The request includes the network location in which the UE is operating. The home network then determines if the network location and a corresponding geographic location are in the cell ID database. If the cell ID database contains the network UE location, the corresponding geographic location is retrieved from the database and used to obtain the A-GPS assistance data. If the cell ID database does not contain the network UE location, a corresponding geographic location is estimated as described above.

DETAILED DESCRIPTION

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

Figure 1:
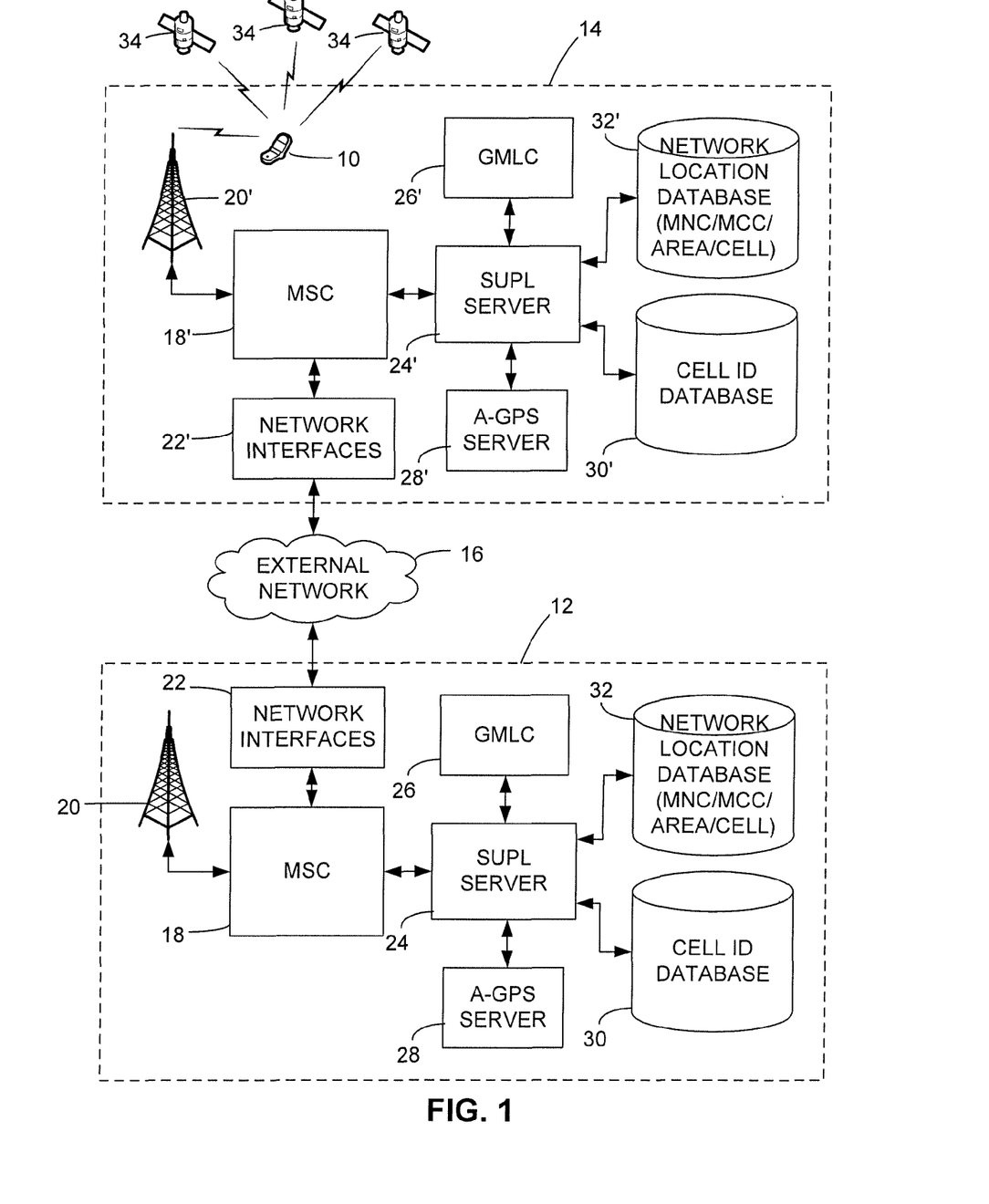
FIG. 1 illustrates a home network and visited network in generalized form, in which a roaming cell phone or other user equipment requires Assisted GPS assistance data.

As illustrated in FIG. 1, in an exemplary embodiment of the invention a mobile telephone (also referred to as a cell phone or mobile station) or other user equipment (UE) 10 has a home network 12 to which it belongs (by virtue of a subscription to services provided via that network 12). This exemplary embodiment addresses the situation in which UE 10 is roaming on a visited network 14 and needs to determine its geographic location using Assisted GPS (A-GPS) because, for example, it is participating in a location-based service (LBS).

In the exemplary or illustrated embodiment, networks 12 and 14 are generally of the Global System for Mobile Communication (GSM) type having the ability to communicate data, such as A-GPS assistance data, via an external network 16 using, for example, the well-known General Packet Radio Service (GPRS) or Universal Mobile Telecommunication System (UMTS). They also conform to aspects of the Secure User Plane Location (SUPL) standard, as described in further detail below. Nevertheless, in other embodiments of the invention they can conform to other suitable standards.

In accordance with the GSM standard, home and visited networks 12 and 14 each include a mobile switching center (MSC) 18 that coordinates operation and communicate with the base stations 20. (Although only one base station is shown in each network 12 and 14 for purposes of clarity, there can be any suitable number, as known in the art. Also, the details of base stations 20 and other elements of the network between base stations 20 and MSCs 18 are not shown or described, as they are well-understood in the art.) MSCs 18 communicate data via external network 16 through network interfaces 22, which are shown in high-level form for purposes of clarity. As persons skilled in the art to which the invention relates understand, network interfaces 22 can include such well-known network interface elements as a Serving GPRS Support Node (SGSN), Gateway GPRS Support Node (GGSN), etc. MSCs 18 also communicate with SUPL servers 24, which in turn communicate in the conventional manner with Gateway Mobile Location Centers (GMLC) 26. As known in the art, a GMLC monitors the locations of user equipment and performs functions needed to provide location-based services. Each of SUPL servers 24 also communicates with an A-GPS server 28, a cell identification (cell ID) database 30, and a network location database 32.

Cell ID databases 30 contain information describing network locations and geographic locations. A network location identifies a place or location in the network with respect to the network topology or other aspects of the network itself. For example, a network location can identify an individual cell by a number or alphanumeric identifier that a network service provider has assigned to it. In contrast, a geographic location identifies a place or location on the earth by, for example, latitude and longitude coordinates. Cell ID database 30 relates network locations to their corresponding geographic locations. For example, cell ID database 30 may contain information indicating that a cell identified as "123456" is located at coordinates (33.46N, 84.25W). In other embodiments of the invention, a network location can include additional or other information, such as a local area code, country code, network code, etc.

Network location databases 32 also contain information describing network locations and geographic locations, but they are used to estimate geographic locations from network locations, as described in further detail below. The network location can comprise some or all of: a Mobile Network Code (MNC), a Mobile Country Code (MCC), a Location Area Code (LAC), and any other information useful for estimating the geographic location of UE 10 in response to its network location.

Although networks 12 and 14 are identical in the illustrated embodiment of the invention, in other embodiments visited network 14 can be of any suitable conventional type that can communicate location information in digital form with home network 12 as described below. In such embodiments, visited network 14 need not be capable of supporting the LBS in which UE 10 is participating or even have SUPL capability, as will become apparent from the description below of the system in operation.

Figure 2A:
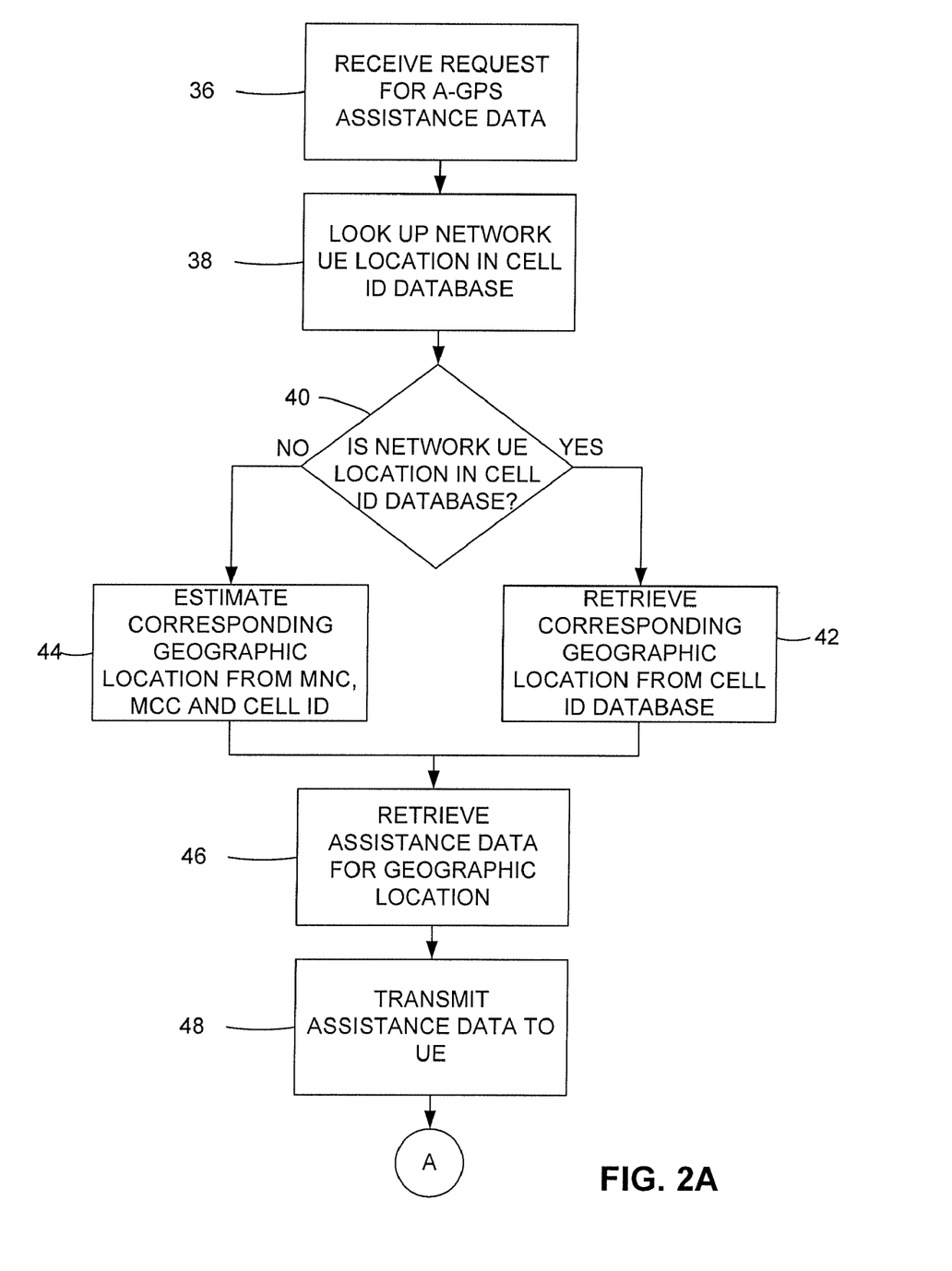
FIGS. 2A-B are a flow diagram illustrating a method for maintaining a roaming cell ID database in real time as the roaming user equipment requests and uses A-GPS assistance data.
Figure 2B:
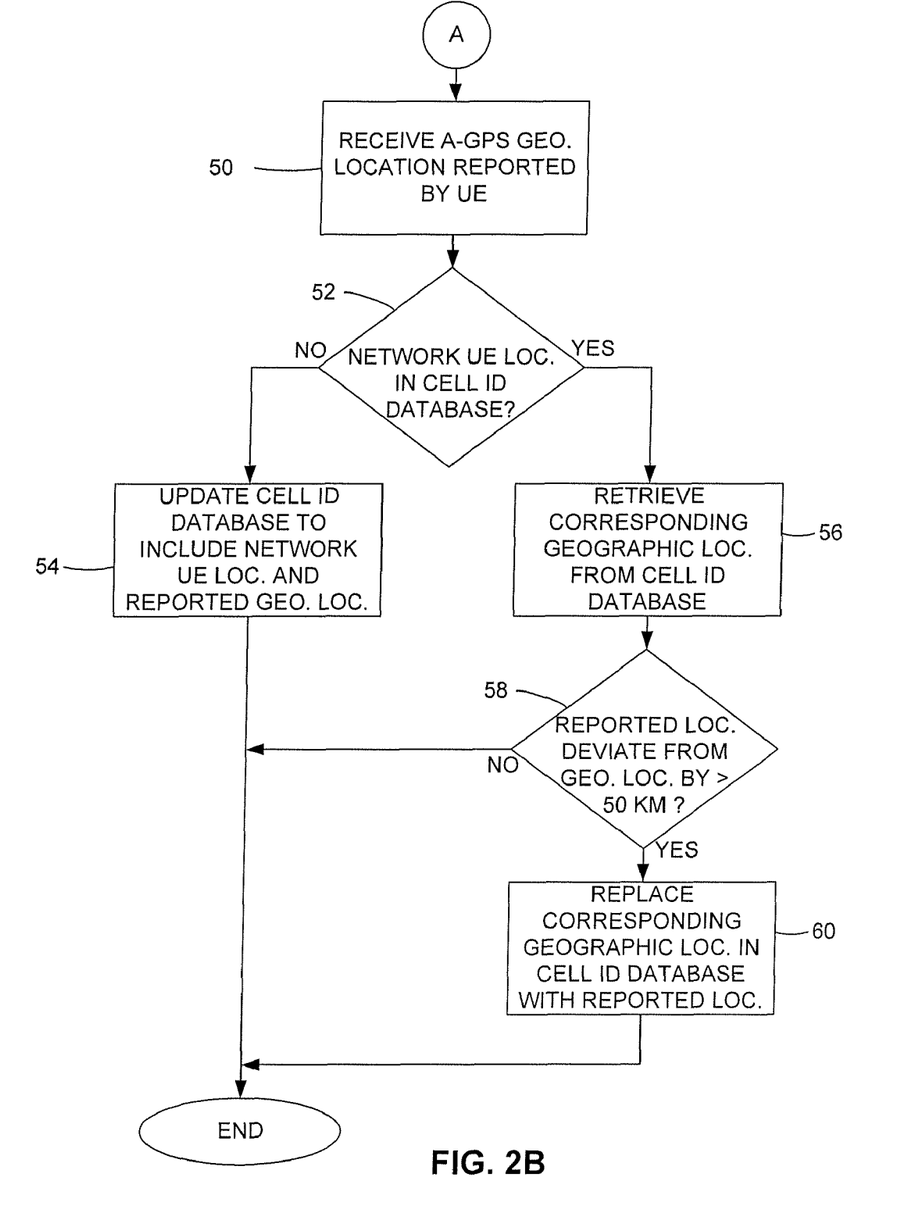

The flow diagram of FIGS. 2A-B illustrates an exemplary method of operation of the system. The steps can be performed by programming or otherwise configuring SUPL server 24 of home network 12. Alternatively, in other embodiments of the invention, a separate server or other device can be included to perform the steps, either by itself or in conjunction with SUPL server 24.

In operation, UE 10 is roaming on visited network 14 when a request for the location of UE 10 is made. UE 10 can request its own location in an instance in which UE 10 is running an LBS application that requires the geographic location of UE 10, or GMLC 26 can request the location of UE 10 in other instances. In instances in which the location request originates with GMLC 26, SUPL server 24 causes the location request to be forwarded to visited network 14, which in turn transmits the request to UE 10. In accordance with A-GPS, to determine its location UE 10 needs to receive not only signals from the GPS satellites 34 (FIG. 1) but also assistance data from home network 12. The flow diagram of FIGS. 2A-B illustrates how home network 12 obtains the A-GPS assistance data and causes it to be transmitted to UE 10 while it is visiting network 14, i.e., roaming.

At step 36, SUPL server 24 of home network 12 receives a request for A-GPS assistance data. The request originates with UE 10 and is forwarded by visited network 14 to home network 12 via external network 16 using GPRS, UMTS or other suitable technology. As in a conventional system, the request for A-GPS assistance data includes a cell ID identifying the cell in which UE 10 is operating, an MNC identifying the service provider on whose network UE 10 is operating, an MCC identifying the country in which UE 10 is operating, and an LAC identifying the local area in which UE 10 is operating. At step 38, SUPL server 24 looks up the cell ID in cell ID database 30. If, as indicated by step 40, the cell ID is contained in cell ID database 30, then at step 42 SUPL server 24 retrieves the geographic location corresponding to that cell ID from cell ID database 30. If it is not contained in cell ID database 30, then at step 44 SUPL server 24 obtains an estimate of the geographic location of UE 10 using the network location information, such as the LAC, MCC and MNC, as described below in further detail.

Once the geographic location of UE has been determined, by it either having been contained in cell ID database 30 or having been estimated based upon network location information other than the cell ID, at step 46 SUPL server 24 uses A-GPS server 28 to obtain the A-GPS assistance data for that geographic location. The manner in which an A-GPS server provides assistance data for a geographic location is well-known in the art and therefore not described herein. At step 48, MSC 18 causes the assistance data to be transmitted to visited network 14 via external network 16 using GPRS, UMTS or other suitable technology. Visited network 14 transmits the assistance data to UE 10 in the conventional manner.

UE 10 uses the assistance data in the conventional manner to determine and report its geographic location. Visited network 14 transmits the location of UE 10 to home network 12 via external network 16. If, as indicated by step 52, the network location of UE 10 is not in cell ID database 30, then at step 54 SUPL server 24 stores the network location and corresponding geographic location of UE 10 in cell ID database 30. Recall that, as indicated by the above-mentioned step 44, an estimated geographic location is used to obtain the assistance data if the network location of UE 10 is not in cell ID database 30. Thus, at step 54 the geographic location actually reported by UE 10 is stored in cell ID database 30 to correct this deficiency. As UE 10 and other such UEs roam and similarly encounter cells for which no corresponding geographic location exists in cell ID database 30, home network 12 continues to populate cell ID database 30 with the geographic locations they report. In this manner, the contents of cell ID database 30 come to reflect the most visited locations. Storage space in cell ID database 30 is not wasted on locations that are never visited, as would occur if data were comprehensively imported from all of the networks (e.g., network 14) with which the service provider operating home network 12 has roaming agreements.

If, as indicated by step 52, the network location of UE 10 already exists in cell ID database 30, then at step 56 SUPL server 24 examines the corresponding geographic location in cell ID database 30 to see if it should be updated. As indicated by step 58, if the geographic location in cell ID database 30 does not deviate from the geographic location reported by UE 10 by more than some predetermined amount (e.g., 50 kilometers), there is no need to update cell ID database 30. However, if the geographic location in cell ID database 30 deviates from the geographic location reported by UE 10 by more than the predetermined amount, then at step 60 SUPL server 24 replaces the geographic location stored in cell ID database 30 corresponding to the network location of UE 10 with the geographic location reported by UE 10, as the geographic location reported by UE 10 is more current. Service providers sometimes renumber or otherwise re-identify cells, and it is possible that a service provider's current identification scheme differs from the scheme that was in place earlier. For example, the cell ID "12345" that may have once been used to identify the cell located at coordinates (33.46N, 84.25W) may currently be used to identify an entirely different cell. The geographic location stored in cell ID database 30 need only be replaced if it differs from the currently reported location by at least an amount that would call for a different A-GPS assistance data set.

Figure 3A:
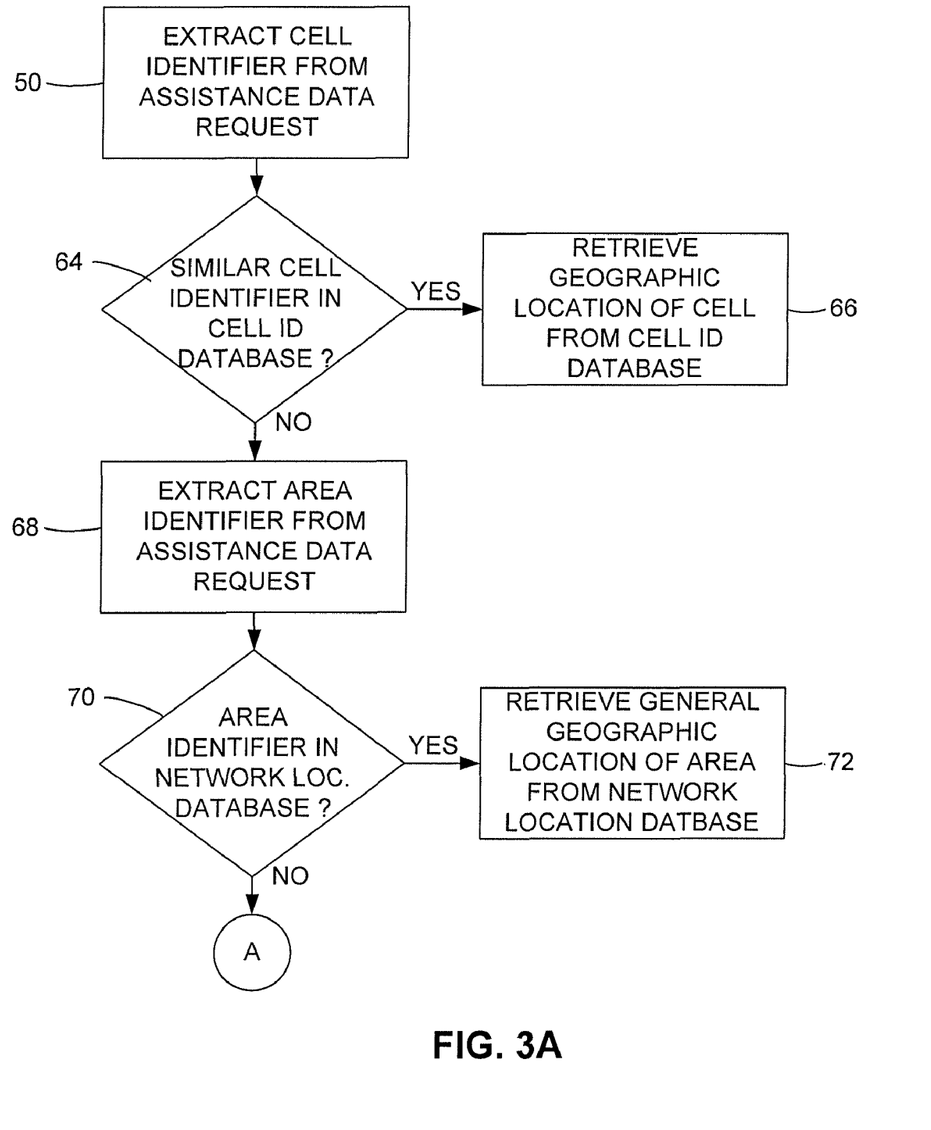
FIGS. 3A-B are a flow diagram illustrating the step of estimating a geographic location in the method illustrated in FIGS. 2A-B.
Figure 3B:
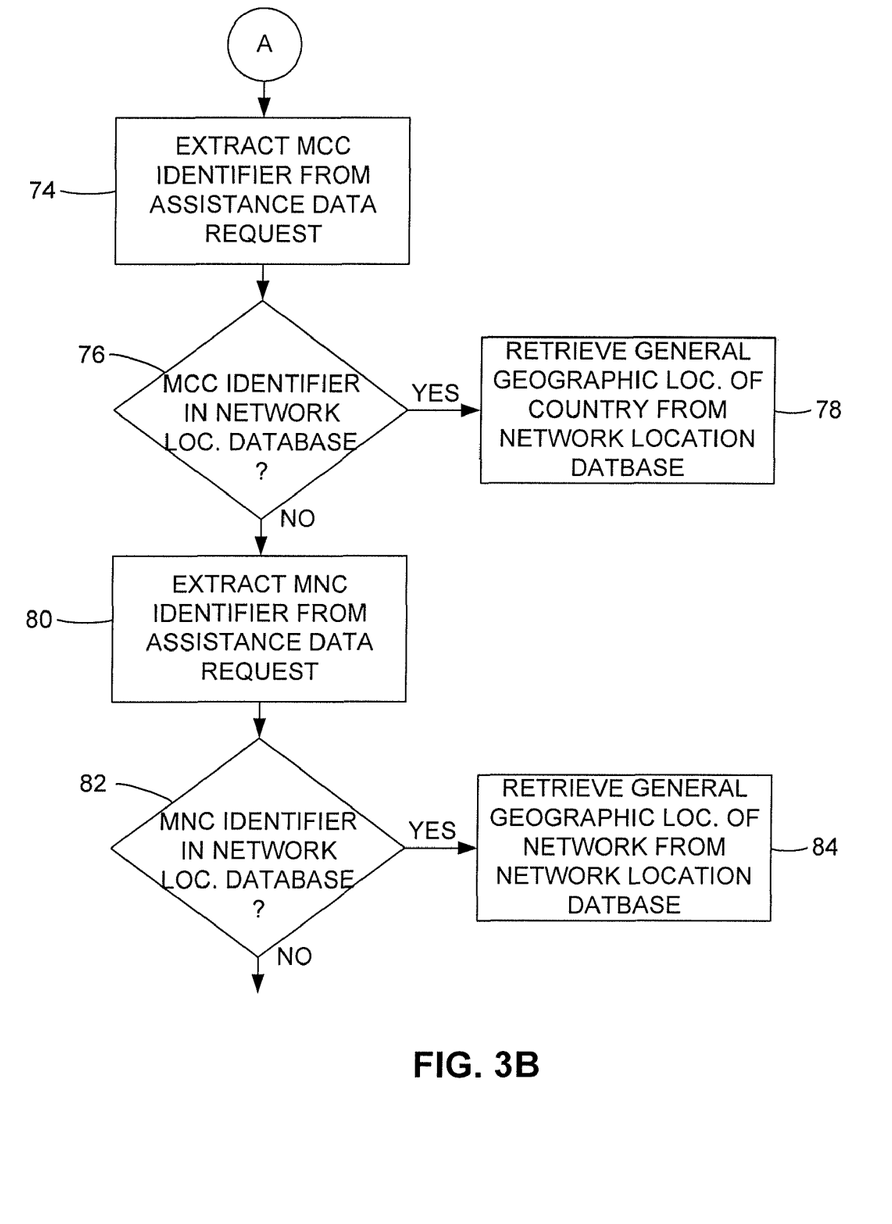

Step 44 of estimating the geographic location of UE 10 when none currently exists in cell ID database 30 is illustrated in further detail in FIGS. 3A-B. The method exploits the hierarchical structure of the network UE location identifiers. A cell, represented by its cell ID, is typically located in a local area, represented by its Local Area Code (LAC). Cells and local areas are, in turn, located within a country, represented by a Mobile Country Code (MCC). A network, represented by a Mobile Network Code (MNC), typically operates within a group of one or more countries or other readily identifiable regions. Thus, the cell ID represents the narrowest identifier in the network location, while the MNC represents the broadest identifier in the network location. The estimation method involves identifying a geographic location corresponding to a broader identifier in the network location of a UE if a narrower identifier in the network location is not included in cell ID database 30.

At step 62, SUPL server 24 examines the cell ID in the network location reported by UE 10 in its request for A-GPS assistance data. If, as indicated by step 64, there is an entry in cell ID database 30 that, while not exactly the same as the cell ID reported by UE 10, is similar (e.g., a relatively long number that differs by only a single digit), then at step 66 SUPL server 24 retrieves that entry as the estimated geographic location of UE 10. The estimate is based upon the reasonable assumption that cells located near one another will have similar identifiers. For example, it is reasonable to assume that cell "123456" will adjoin or at least be relatively near cell "123457." As the same set of assistance data typically applies to the geographic area covering a large number of cells, it is not necessary to determine the geographic location of UE 10 with accuracy to the exact cell in which UE 10 is operating.

If there is no similar cell ID in cell ID database 30, then at step 68 SUPL server 24 examines the LAC in the network location reported by UE 10. If, as indicated by step 70, there is an entry for that LAC in network location database 32, then at step 72 SUPL server 24 retrieves that entry as the estimated geographic location of UE 10. Network location database 32 can include all of the LACs in a country and a corresponding geographic location for each, such as the geographic center of the area covered by that LAC or other representative geographic location. As the same set of assistance data often applies to the geographic area covered by a cluster of one or more LACs, A-GPS server 28 will likely produce a useful assistance data set in response to a representative geographic location in any of one of those LACs.

If the LAC does not exist in network location database 32, then at step 74 SUPL server 24 examines the MCC in the network location reported by UE 10. If, as indicated by step 76, there is an entry for that MCC in network location database 32, then at step 78 SUPL server 24 retrieves that entry as the estimated geographic location of UE 10. Network location database 32 can include all of the MCCs of countries in which the home network service provider has roaming partners and a corresponding geographic location for each, such as the geographic center of that country or other representative geographic location.

If the MCC does not exist in network location database 32, then at step 80 SUPL server 24 examines the MNC in the network location reported by UE 10. If, as indicated by step 82, there is an entry for that MNC in network location database 32, then at step 84 SUPL server 24 retrieves that entry as the estimated geographic location of UE 10. Network location database 32 can include all of the MNCs of the home network service provider's roaming partners and a corresponding geographic location for each, such as the geographic center of the roaming partner network or other representative geographic location. As databases 30 and 32 are likely to include more information regarding the world's major networks than smaller, minor networks, the method will likely only resort to estimation based upon this broader end of the hierarchy when the roaming occurs on a minor, rarely visited network.

Although in the exemplary embodiment of the invention databases 30 and 32 are separate, in other embodiments they can be integrated with one another. Also, in other embodiments methods other than database lookup can be used to estimate a geographic location. The term "database" is used for convenience to refer to any suitable information storage and retrieval system and is not intended to be construed narrowly (e.g., limited to a relational database).

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for providing Assisted Global Positioning System (A-GPS) assistance data to wireless telecommunication system user equipment (UE), comprising:

receiving a request for A-GPS assistance data for a UE located on a roaming network, the request identifying a network location in which the UE is operating, the network location including a cell ID, a Location Area Code (LAC), a Mobile Country Code (MCC), and a Mobile Network Code (MNC);

determining that a cell identification (cell ID) database, the cell ID database relating a plurality of network locations to a plurality of corresponding geographic locations, does not include the cell ID identified in the request for A-GPS assistance data;

determining that the cell ID database does not include a similar cell ID to the cell ID identified in the request for A-GPS assistance data, the similar cell ID differing from the cell ID by a single digit;

estimating a corresponding geographic location in response to the request for A-GPS assistance data, the estimating including:

determining a geographic location from a network location database by using the LAC in the network location, determining a geographic location from the network location database by using the MCC in the network location if the LAC in the network location is not included in the network location database, and determining a geographic location from the network location database by using the MNC in the network location if the MCC in the network location is not included in the network location database;

identifying assistance data associated with the corresponding geographic location for transmittal to the UE;

receiving a geographic location reported by the UE in response to the assistance data transmitted to the UE; and updating the cell ID database to relate the cell ID in the request for A-GPS assistance data to the geographic location reported by the UE.

2. The method claimed in claim 1, further comprising:

determining that the corresponding geographic location differs from the geographic location reported by the UE by more than a predetermined distance; and updating the cell ID database to relate the cell ID to the corresponding geographic location reported by the UE.

3. A system for providing Assisted Global Positioning System (A-GPS) assistance data to wireless telecommunication system user equipment (UE), comprising:

a cell identification (cell ID) database relating a plurality of network locations to a plurality of corresponding geographic locations;

a UE location system for receiving a request for A-GPS assistance data for a UE located on a roaming network, the request identifying a network location in which the UE is operating, the network location including a cell ID, a Location Area Code (LAC), a Mobile Country Code (MCC), and a Mobile Network Code (MNC), the UE location system:

determining that the cell ID database does not include the cell ID in the request for A-GPS assistance data;

determining that the cell ID database does not include a similar cell ID to the cell ID in the request for A-GPS assistance data, the similar cell ID differing from the cell ID by a single digit; and estimating a corresponding geographic location in response to the request for A-GPS assistance data, the estimating comprising;

determining a geographic location from a network location database by using the LAC in the network location, determining a geographic location from the network location database by using the MCC in the network location if the LAC area in the network location is not included in the network location database, and determining a geographic location from the network location database by using the MNC in the network location if the MCC in the network location is not included in the network location database; and an A-GPS server identifying assistance data associated with the corresponding estimated geographic location for transmittal to the UE;

wherein the UE location system further:

receives a geographic location measured by the UE in response to the assistance data transmitted to the UE; and updates the cell ID database to relate the cell ID in the request for A-GPS assistance data to the measured geographic location reported by the UE.

4. The system claimed in claim 3, wherein the UE location system comprises a user plane location server.

5. The system claimed in claim 3, wherein the UE location system further determines that the corresponding geographic location differs from the location reported by the UE by more than a predetermined distance; and updates the cell ID database to relate the cell ID to the corresponding geographic location reported by the UE.

6. A method for maintaining a geographic cell identification (cell ID) database in real time, the cell ID database relating a plurality of wireless telecommunication network locations to a plurality of corresponding geographic locations, the method comprising:

receiving a network location as part of a request for Assisted Global Positioning System (A-GPS) assistance data and an A-GPS location reported by a user equipment (UE) located on a roaming network, the network location including a cell ID, a Location Area Code (LAC), a Mobile Country Code (MCC), and a Mobile Network Code (MNC);

determining that the cell ID database does not include the cell ID in the request for A-GPS assistance data;

determining that the cell ID database does not include a similar cell ID to the cell ID in the request for A-GPS assistance data, the similar cell ID differing from the cell ID by a single digit; and estimating a corresponding geographic location in response to the request for A-GPS assistance data using any combination of the LAC, MCC, and MNC;

determining that the cell ID database does not include a corresponding geographic location differing from the geographic location reported by the UE by less than a predetermined amount; and storing the cell ID and related geographic location reported by the UE in the cell ID database.

7. The method claimed in claim 6, wherein the estimating further comprises:

determining a geographic location from a network location database by using the LAC in the network location, determining a geographic location from the network location database by using the MCC in the network location if the LAC in the network location is not included in the network location database, and determining a geographic location from the network location database by the MNC in the network location if the MCC in the network location is not included in the network location database.

8. The method claimed in claim 7, further comprising identifying A-GPS assistance data in response to the estimated geographic location.

* * * * *